United States Patent Office 2,989,932
Patented June 27, 1961

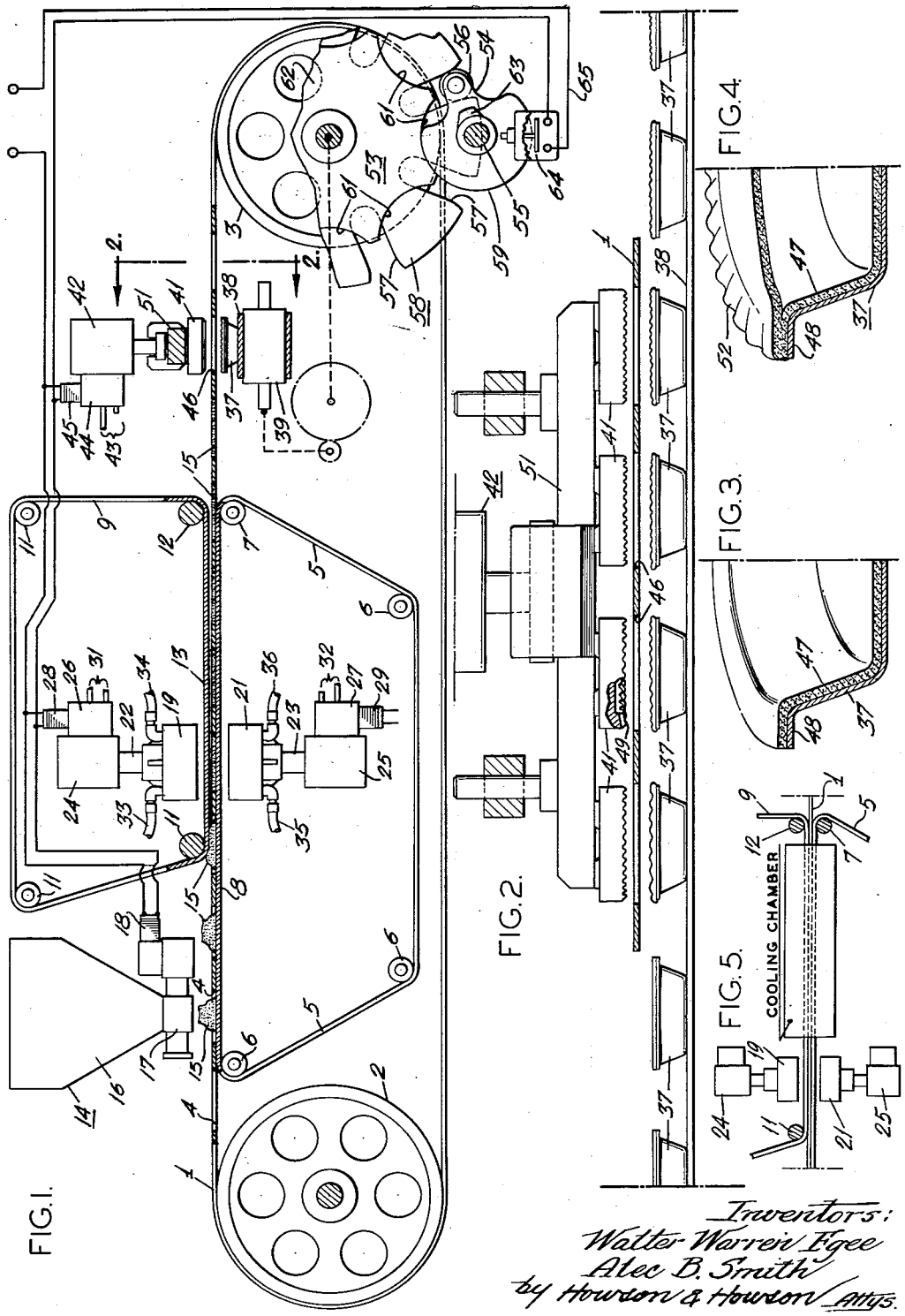

2,989,932
APPARATUS FOR APPLYING AND FORMING PIE TOPS
Walter Warren Egee, Wallingford, Pa., and Alec B. Smith, Riverton, N.J., assignors to Campbell Soup Company, Camden, N.J., a corporation of New Jersey
Filed Sept. 11, 1958, Ser. No. 760,387
7 Claims. (Cl. 107—1)

This invention relates to apparatus for forming pie tops and a principal object of the invention is to provide a simple and efficient apparatus for molding the dough, of which the pie top is formed, to desired size and shape, depositing the molded dough on the pie plate containing the other pie ingredients, with or without a lower crust, and crimping the peripheral edge of the deposited top, in accordance with conventional practice, to weld the top to the lower crust or to the rim of the plate forming the backing for the crimping operation.

In accordance with the invention, the apparatus comprises a mold which moves in a cyclical path, together with mechanical units located along said path which successively deposit a measured quantity of dough in the mold cavity, press the dough into the cavity so that it conforms to the shape of the latter, chills the dough in the cavity, transfers the dough from the cavity to the top of the pie plate containing the other pie ingredients, and crimps the peripheral edge of the dough in accordance with the conventional practice.

In the mbodiment of the invention illustrated in the drawings, the cyclically movable mold consists of an endless, flexible belt of metal or other suitable material having therein one or more holes or openings which individually constitute the mold cavities. A closure element is provided for the bottom of the mold cavity which moves with the belt-like body of the mold over a part, only, of the aforesaid cyclical path, and a corresponding closure is provided for the top of the mold cavity also movable with the mold body but over a lesser part of the said path. The invention contemplates a stripping of these closures away from the opposite faces of the mold body simultaneously, and at points directly opposite each other on the said faces, and the function of this stripping operation will be hereinafter described.

The means for depositing the measured quantities of dough in the openings in the endless belt which constitute the mold cavities is located at a position overlying one end of the lower closure member so that the lower closure acts to support the dough deposited in the mold opening. Thereafter the opening passes under the upper closure member, which, in effect, closes the opening.

Pressure is then applied to the closures simultaneously to press them against the opposite sides of the mold belt to thereby spread the dough in the cavity so as to completely fill the mold cavity and assume the shape and dimensions of the latter.

Simultaneously with this press operation, or immediately following, the dough within the mold is chilled, so that it stiffens and assumes a state in which it is capable of sustaining itself in the opening by contact only with the peripheral edge of the latter after the said closures are withdrawn. By stripping the closures from the opposite faces of the mold body simultaneously and at points directly opposite each other, there is no tendency for the dough mass to adhere to either of the closures during retraction, and the dough is left intact within the mold cavity.

Following withdrawal of the closures as described, the mold advances to a station wherein a mechanical transfer unit removes the molded and chilled dough from the mold cavity. This is accomplished by a heated plunger, which moves downwardly through the opening which constitutes the mold cavity, and displaces the dough from the latter. At this station means is provided for feeding pie plates containing the other pie ingredients to a position aligned with the transfer plunger, so that the dough top displaced from the cavity is deposited on the plate.

The working face of the transfer plunger is generally annular in form, and is crimped so that the plunger, acting against the rim of the plate as a backing, crimps the peripheral edge of the pie top and in effect welds the edge to the underlying edge of the lower crust, or, in the absence of a lower crust, to the rim of the plate.

An important feature of the invention resides in the fact that the machine will produce the pie tops without waste or trim.

The invention will be more readily understood by reference to the attached drawings in which:

FIG. 1 is a diagrammatic, side elevational view of forming apparatus made in accordance with the invention.

FIG. 2 is a sectional view on a large scale, taken on lines 2—2, FIG. 1.

FIG. 3 is a fragmentary, sectional, perspective view of a pie plate with the dough of the lower crust of the pie in place.

FIG. 4 is a corresponding view, showing the same plate with the top crust dough in place, and with the peripheral edges of both top and bottom crust doughs crimpesd for the purpose described above, and FIG. 5 is a fragmentary, diagrammatic, conventional view, illustrating a modification within the scope of the invention.

With reference to the drawings, the endless, flexible, metallic strap or belt which, in this case, constitutes the body of the mold, is indicated by the reference numeral 1. As previously described, this strap travels in a cyclical path around pulleys 2 and 3. The strap 1 contains a longitudinal series, or a plurality of such series, of round openings 4, which constitute the mold cavities. The strap has a thickness which corresponds, in the present instance, approximately to the desired thickness of the pie top, and for general purposes, a strap thickness of approximately one-sixteenth of an inch has been found suitable. Preferably the strap is made of stainless steel, although other materials may be used if desired.

The lower closure member for the mold cavity is constituted, in the present instance, by an endless belt 5, which travels on idler pulleys 6 and a driven pulley 7. The upper run 8 of this belt lies flatly against the underside of the mold strap 1, and thereby affords an effective bottom closure for those of the mold openings or cavities 4, which at any moment overlie said upper run.

The top closure for the mold cavities is formed, in this instance, by an endless belt 9, which travels on idler pulleys 11 and a driven pulley 12, the lower run 13 of this belt overlying the upper surface of the mold strap 1, as illustrated. In accordance with the invention, the axes of the driven pulleys 7 and 12 of the respective belts 5 and 9 occupy a common plane normal to the plane of the mold strap 1. The said strap and belts travel in the directions indicated by the arrows in FIG. 1, and the effect of the aforesaid relative location of the pulleys 7 and 12 is to strip the belts 5 and 9 away from the respective proximate faces on the strap 1, simultaneously, and at points which lie directly opposite each other in the normal plane aforesaid. The belts 5 and 9 suitably may be formed of plastic such, for example, as polyethylene, neoprene, Mylar, rubber or like material.

The upper run 8 of the lower belt 5 is of greater length than the lower run 13 of the belt 9, so that, as illustrated in FIG. 1, the belt 8 extends at the end adjoining to pulley 2 well beyond the corresponding end of the belt 9. In this area of the belt 8, which is not obstructed by the belt 9 at the roller 11. The roller, which is slightly eleto deposit in each of the mold cavities 4 a predetermined, measured quantity of dough indicated in FIG. 1, by the reference numeral 15. The dispenser 14 comprises a suitable hopper 16, and a solenoid-operated valve 17 at the bottom of the hopper, which, when actuated, deposits the dough in aforesaid measured quantity within the cavity and upon the upper run 8 of the conveyor 5, which forms, in effect, the bottom of the mold cavity. In the present instance, the solenoid which actuates the valve 17 is indicated by the reference numeral 18.

As the strap 1 and belt 8 advance as a unit, the dough in the mold cavity is brought under the lower run of the belt 9 at the roller 11. The roller, which is slightly elevated from the surface of the strap, tends to flatten the dough in the cavity. Within an area of the strap 1 which lies between the belts 5 and 9, means is provided for creating the pressure on the relatively remote faces of the belts 5 and 9 required to compress the dough mass in the cavity and to cause the mass to assume the shape of the cavity, and to this end the quantity of dough deposited in the cavities slightly exceeds in volume the capacity of the individual cavity. The press means comprises an upper platen 19 and a lower platen 21, which normally are retracted from the confronting surfaces of the belts 9 and 5 as illustrated in FIG. 1. The platens 19 and 21 are supported respectively on rams 22 and 23, which operate in fluid pressure cylinders 24 and 25 respectively. Admission and discharge of the pressure fluid to and from the cylinders 24 and 25, through pipes 31 and 32, is controlled by valves 26 and 27 which are actuated by solenoids 28 and 29 respectively. Admission of pressure fluid to the cylinders 24 and 25, which occurs simultaneously, causes the platens 19 and 21 to move together against the belts 9 and 5 respectively, so that the belts are pressed against the strap 1 in areas of the mold cavities, forcing the belts against the opposite faces of the strap, and compacting the dough into the cavities so that it assumes, in effect, the form of a flat disc of thickness approximately that of the strap, and completely fills the cavities.

In the embodiment of FIG. 1, means is provided for chilling the platens 19 and 21, said means comprising, in the present instance, devices including ducts 33, 34, 35, and 36 for circulating a refrigerating or refrigerated fluid through the platen. As hereinafter described, the intermittent motion of the strap 1 and of the belts 5 and 9 is such that the dwell of the platens in compressive engagement with the belts will be sufficiently extended to insure the required degree of chilling of the dough in the cavity. This chilling stiffens the dough, and gives it the consistency necessary to enable it to support itself within the cavity holes of the strap 1 after the belts 5 and 9 have been stripped away from the opposite faces of the strap as previously described. It will be apparent that this simultaneous stripping of the belts from the faces of the straps has the effect of peeling the belts around the pulleys 7 and 12 simultaneously from the opposite faces of the dough within the mold cavities, so that the stiffened dough has no tendency to adhere to either of the belts and will remain in the holes in adherence solely to the peripheries of the latter.

The continued movement of the strap 1 brings the cavities individually into the transfer station wherein, as previously described, the formed dough is transferred from the mold cavity to the top of a pie plate 37, fed to the station on a transverse belt 38 operating on a driven pulley 39. Transfer is effected through the medium of a plunger 41, which operates in a cylinder 42, through the medium of pressure fluid admitted to the cylinder through pipes 43 from the aforesaid fluid source. A valve 44, actuated by solenoid 45 controls the admission and discharge of the pressure fluid to and from the cylinder. Admission forces the plunger 41 downwardly through the aligned mold cavity 46, displacing the molded dough from the cavity, and thereby transferring it to the top of the underlying plate 37. The downward movement of the plunger continues until the lower face of the plunger comes into pressure engagement with the peripheral edge portion of the dough pie top, now supported directly or indirectly on the lip of the plate 37. In the present instance, the previously greased plate 37 has been provided with the dough lining 47, which is to form the bottom crust of the pie, and the plate will also contain the pie filling, not shown. The lower crust dough extends over the rim 48 of the plate as shown in FIG. 3. When, therefore, the pie top is transferred from the mold cavity, as described above, it will rest at its edges upon the peripheral edge portion of the lower-crust dough, resting upon the rim 48. In accordance with the invention, the plunger 41, or the working face thereof, is cupped as illustrated in FIG. 2, and the advancing rim portion of the cup is crimped radially, as indicated at 49. Also, means is provided in the form, in the present instance, of an electric heating element 51, for heating the plunger 41, so that when the plunger is moved downwardly into pressure engagement with the peripheral portion of the upper crust dough, as described above, the crimped heated surface of the plunger will impress itself into the dough, and will thereby weld the dough of the upper crust in the peripheral area with the dough of the lower crust. This crimping is shown at 52, in FIG. 4. This completes the operation.

Mechanism is provided for intermittently operating the several moving parts of the apparatus in the timed relation necessary for automatic operation as described above. In the present instance, this mechanism is shown as comprising a modified Geneva movement, designated generally by the reference numeral 53 in FIG. 1. This movement comprises as an element thereof a crank 54 on a rotary shaft 55, the crank pin 56 being operatively associated with the radial slotted recesses 57 of the Geneva wheel 58. Associated with the crank is a cam 59 which cooperates with the segmental surfaces 61 of a disc 62 operatively associated with the wheel 58 in well-known manner to hold the wheel stationary during a predetermined portion of the angular movement of the crank 54. The crank carries on its hub a cam 63 which in each revolution engages a micro-switch 64 to close a circuit 65, which contains the solenoids 18, 28, 29, and 45, to simultaneously operate the depositing unit 14, the press unit 24, 25, and the transfer unit 42. These units being relatively arranged so that in each dwell of the intermittent movement of the strap 1, one of the mold cavities occupies each of the said depositing, press and transfer stations. Means is provided also for operatively connecting the shaft of the pulley 3 with the pie plate feeder belt 38, and with the pulleys 7 and 12 of the belts 5 and 9, so that these elements of the apparatus move together simultaneously in the intermittent movement.

It will be apparent that the apparatus is subject to modification without departure from the principles of the invention, and one such modification is illustrated in FIG. 5. In this case the chilling means for the dough in the mold cavities is disassociated from the platens of the press, and the mold cavities, after being subjected to the operation of the press, pass through a cooling chamber in which the chilling of the dough takes place. While in the illustrated embodiment, the mold takes the form of an endless belt having apertures which constitute the mold cavities, it will be clear that in the broader aspects of the invention the actual physical form of the mold body and the material of which it may be made may vary widely.

We claim:

1. In apparatus for forming pie tops from dough, the combination with a mold body having a through opening constituting a mold cavity, said mold having, the area contour and depth, respectively, necessary to form in said cavity when filled with dough, the said pie top, comparable at least, to the required thickness therefor and the size, and shape characteristics for a pre-selected pie, and mechanism for moving the body for traversing the cavity in a cyclical path, means positioned on said path for filling the cavity with dough, means for feeding a pie plate of comparable size and shape to said pre-selected pie, to the underside of the mold body into axial alignment with the said cavity at a station on said path, a plunger of comparable size and shape to said cavity at said station positioned above said mold body, means for moving said plunger downwardly into and through the said cavity to displace the dough from the latter and to press the dough on the plate, and means for cyclically actuating in succession said mold filling means, said pie plate feeding means and said plunger in timed relation with the cyclic arrival of said mold cavity first at said filling position and second at said station.

2. Apparatus in accordance with claim 1 wherein closure means are provided for said mold cavity movable with said mold body for a selected portion of its path of travel, said closure means comprising a pair of endless belts positioned at opposite sides of said mold body, and guide means for guiding said endless belts into engagement with the opposite sides with said mold body adjacent the means for filling the mold cavity with dough, and wherein the means for filling the mold cavity with dough comprises opposed platens movable into compressive engagement with opposite faces of said endless belts overlying the mold cavity.

3. Apparatus according to claim 2 including means for chilling the said platens.

4. Apparatus according to claim 3 including means for intermittently actuating the mold-traversing mechanism, the said closure belts and the press unit so as to maintain the platens in compressive engagement with belts for a period sufficient to chill the dough in the cavity.

5. Apparatus according to claim 1 including means for heating the plunger.

6. Apparatus according to claim 5, wherein the dough displacing face of the plunger comprises a crimped peripheral area, and wherein further the transfer unit comprises mechanism for advancing the plunger through the said mold opening and into pressure relation with the rim of the plate receiving the displaced dough, to crimp the edge of the latter.

7. Apparatus according to claim 1, wherein the dough-displacing face of the plunger has a crimped edge for crimping the peripheral edge portion of the dough on the plate.

References Cited in the file of this patent

UNITED STATES PATENTS

| | | |
|---|---|---|
| 778,295 | Williams | Dec. 27, 1904 |
| 786,816 | Hutchison | Apr. 11, 1905 |
| 1,751,430 | Thomson | Mar. 18, 1930 |
| 2,157,570 | Raynolds | May 9, 1939 |
| 2,160,783 | McDonald | May 30, 1939 |
| 2,280,324 | Tracy | Apr. 21, 1942 |